United States Patent [19]

Adell

[11] 4,365,450
[45] Dec. 28, 1982

[54] DOOR EDGE GUARD

[75] Inventor: Robert Adell, Novi, Mich.

[73] Assignee: U.S. Product Development Co., Novi, Mich.

[21] Appl. No.: 194,748

[22] Filed: Oct. 7, 1980

[51] Int. Cl.³ .............................................. B60J 5/00
[52] U.S. Cl. .......................................... 52/98; 49/462;
 52/716; 428/910
[58] Field of Search .................. 52/716, 208, 400, 98,
 52/99; 428/910; 49/462

[56] References Cited

U.S. PATENT DOCUMENTS

| Re. 30,726 | 9/1981 | Otten et al. | 42/835 X |
|---|---|---|---|
| 2,704,688 | 3/1955 | Adell | 49/462 |
| 2,809,728 | 10/1957 | Olson | 52/400 |
| 3,322,613 | 5/1967 | Rasmussen | 428/910 X |
| 3,340,224 | 9/1967 | Sherman et al. | 52/400 X |
| 4,259,812 | 4/1981 | Adell | 49/462 |
| 4,316,348 | 2/1982 | Adell | 52/716 X |

Primary Examiner—Alfred C. Perham
Attorney, Agent, or Firm—Stephenson and Boller

[57] ABSTRACT

An ornamental and protective vehicle door edge guard comprises a metallic strip of generally U-shaped cross section which is self-retaining on the door edge. An insulating liner is disposed between the metallic edge guard and the door edge and comprises a thin sheet of plastic film arranged with the grain running generally lengthwise of the edge guard.

6 Claims, 9 Drawing Figures

DIRECTION OF GRAIN

DOOR EDGE GUARD

BACKGROUND AND SUMMARY OF THE INVENTION

This invention relates to ornamental and protective edge guards which are applied to the edges of sheet metal closures of an automotive vehicle, such as the vehicle's doors.

In a typical automotive vehicle, door edge guards are applied to the trailing edges of the vehicle's doors to protect the door edges from damage which might be caused by striking an object which may be present in a door's path when the door is opened. It is very desirable for such door edge guards to be made of bright metal, such as stainless steel, aluminum, or bimetal, due to the superior protective and ornamental characteristics of such material. Furthermore, the inherent strength and resiliency of such metallic edge guards enable them to be self-retaining on the doors. Correspondingly, it is generally undesirable to use separate fasteners or adhesives in securing door edge guards to doors since they involve extra cost in labor and materials. It is also generally undesirable to use non-metallic edge guards, such as vinyl edge guards, since they do not possess the superior protective, ornamental, and self-retention characteristics of the bright metallic edge guards. In connection with the usage of self-retaining door edge guards, it has heretofore been recognized that the potential for paint scratching and marring exists when the metallic edge guards are applied to vehicle doors. Such paint scratching can lead to premature corrosion of the door edge metal.

Some of applicant's own prior inventions have addressed the paint scratching problem and provided solutions. For example, see applicant's own U.S. Pat. No. 2,704,687 and applicant's pending U.S. patent applications Ser. No. 118,475 filed Feb. 4, 1980 4,334,700, Ser. No. 132,525 filed Mar. 21, 1980 4,316,348 Ser. No. 21,084 filed Mar. 15, 1979 4,259,812 and Ser. No. 21,085 filed Mar. 16, 1979 4,271,637.

In these pending applications the use of plastic liners to insulate the metallic edge guard from the door edge is disclosed. These liners may be plastic extruded to form a generally U-shaped cross section suitable for nesting within the U-shaped metallic edge guard. The use of foam plastic as a linear is also contemplated.

The present invention is directed to an improved metallic edge guard and insulating liner construction which provides additional advantages and benefits. More specifically the invention permits the liner to be made from a thin sheet of plastic film which would generally not be recognized as suitable for such usage. This means that the process of extruding plastic to a given cross sectional shape which will fit within the metallic edge guard, as described in the aforementioned patent applications, can be done away with thereby yielding a valuable economy in manufacture of insulated edge guards. Moreover the invention may be practiced with virtually any construction of metallic edge guard.

In a self-retaining door edge guard the free end of each leg bears against opposite sides of the marginal door edge portion on which the edge guard is disposed. During application of the edge guard to the door the leg of the edge guard customarily flexes outwardly to accomodate the door edge. Where an insulating liner is disposed between the metallic edge guard and the door, the liner, particularly the liner legs, are subjected to rather severe compressing and deformation forces during application of the edge guard to the door. Of course with an extruded liner the inherent strength of the extrusion tends to obscure the very existence of these forces and they would certainly not be considered a problem. However in view of the interaction between the edge guard and the door, the use of a thin plastic film for an insulator would seem undesirable.

Applicant has discovered a new and unique construction whereby a thin sheet of plastic film may be used as a liner for a metallic edge guard in spite of the rather severe forces encountered during application of the edge guard to a door. As a result the manufacturer of an insulated door edge guard does not require the use of extruded liners, thereby yielding a more economical construction. Instead it is possible to use thin plastic sheet material which is readily commercially available from a number of commercial sources.

Briefly the invention provides an improved door edge guard construction wherein the insulating liner comprises a thin sheet of grained plastic film arranged with the grain running generally lengthwise of the edge molding. The sheet of plastic film is highly resistant to tearing across the grain, and therefore when the edge guard is applied to the door, the compression and deformation forces act across the grain of the liner, which is where the film possesses maximum strength and resistance to tearing. Thus the improved edge guard of the present invention allows the thin liner film to remain intact so as to protectively insulate the metallic edge guard from the door metal after the installation is complete.

The forgoing features, advantages and benefits of the invention, along with additional ones, will be seen in the ensuing description and claims which should be considered in conjunction with the accompanying drawings. The drawings disclose presently preferred embodiments of the present invention according to the best mode presently contemplated in carrying out the invention.

DESCRIPTION OF THE PREFERRED EMBODIMENTS

Figure 1:
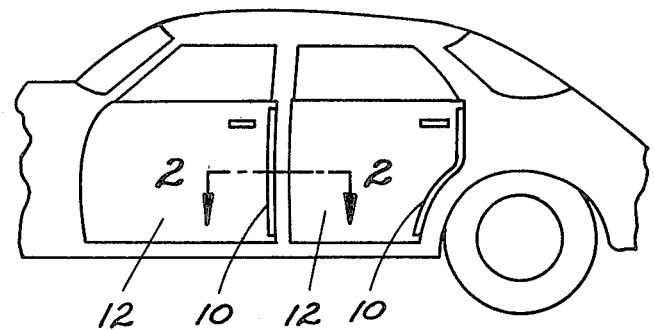
FIG. 1 is a fragmentary side elevational view of an automobile body showing edge guards on the doors in accordance with principles of the present invention.
Figure 2:
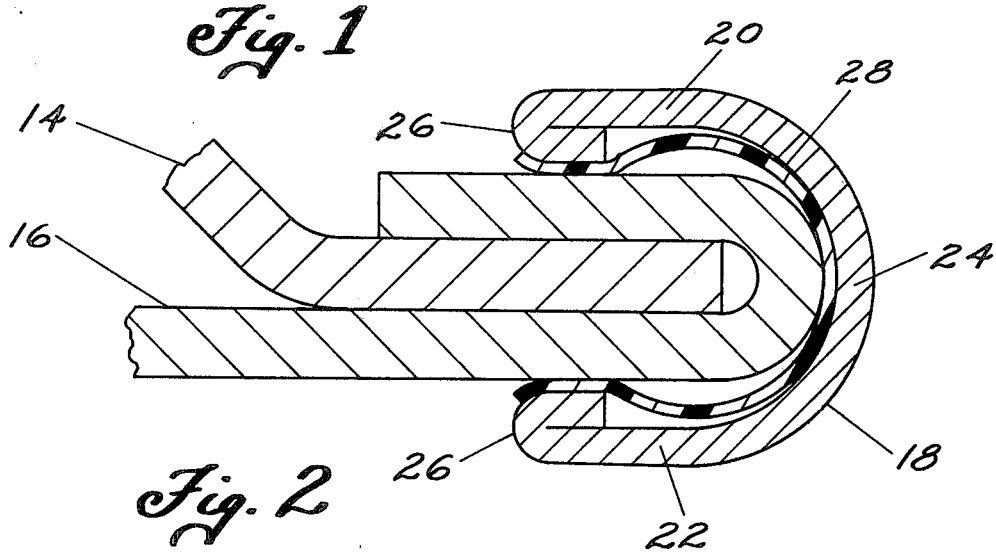
FIG. 2 is a sectional view, on an enlarged scale, taken along the direction of arrows 2—2 in FIG. 1.

FIG. 1 illustrates an ornamental and protective edge guard 10 embodying principles of the present invention applied to each of the doors 12 of an automobile. The shape of each edge guard corresponds to the shape of the trailing edge of the corresponding door to which it is applied, as can be seen in FIG. 1. The illustrated edge guards are shown to be coextensive in length with the trailing edges of the doors; however, they may be shorter, depending upon the specific requirements for a given model of automobile. As can be seen in FIG. 2, the typical door edge to which a door edge guard is applied include an inner sheet metal door panel 14 around the free edge of which is wrapped the peripheral margin of an outer sheet metal door panel 16. For various reasons involved in the prevailing manufacture of vehicle doors, the thickness of the door edge is subject to substantial variation in dimension and a satisfactory door edge guard must be capable of accomodating the substantial variations. Typically the dimension across the throat of the edge guard is dimensioned to accomodate a minimum thickness door edge and the legs of the edge guard may flex outwardly to accomodate edges of larger thickness.

Figure 3:
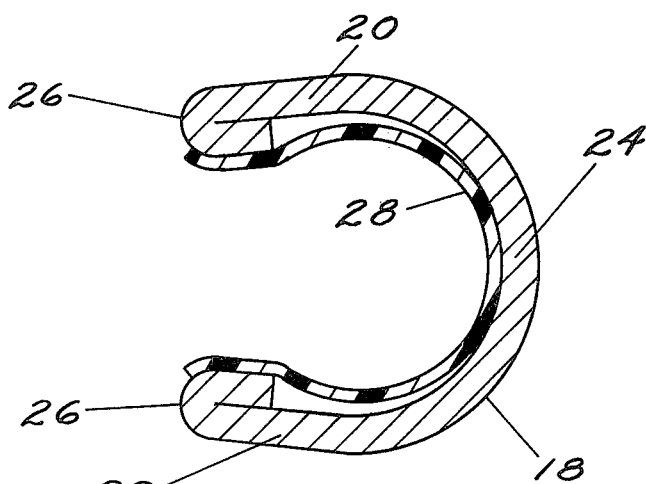
FIG. 3 is a view similar to FIG. 2 but showing the metallic edge guard molding and liner construction by itself.
Figure 4:
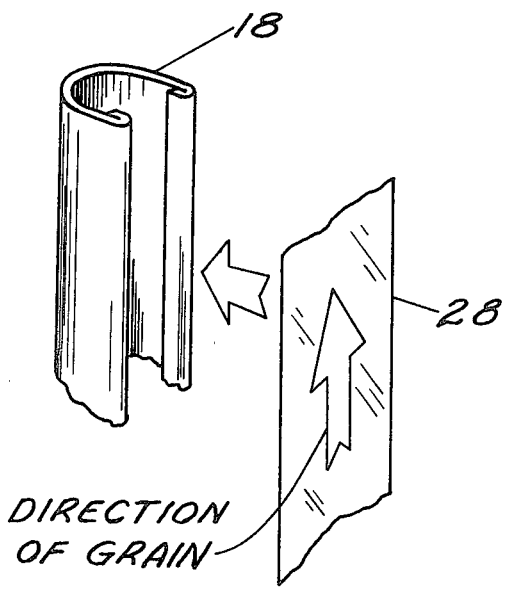
FIG. 4 is a fragmentary perspective view of the molding and liner illustrating one possible way to assemble the liner to the molding.

FIGS. 2, 3 and 4 illustrate a first embodiment of edge guard construction in accordance with principles of the present invention. The edge guard comprises a metallic molding strip 18 of generally U-shaped cross section having an inner leg 20, and outer leg 22 and a bottom 24 joining the two legs. The extremity, or free end, of each leg is formed with a bead 26. In the installed condition on the marginal edge portion of the door beads 26 bear against opposite sides of the door edge with the resiliency of the metal of the edge guard molding thereby serving to provide self-retention of the molding on the door. A non-metallic strip 28 is disposed to form an insulating liner between the metallic edge guard molding 18 and the door edge. As can be seen in FIGS. 2 and 3 the liner strip 28 lines essentially the entire interior of the U-shaped section including the beads 26 thereby precluding contact of the metal of the edge molding with the metal of the door. Thus the liner conforms generally to the U-shape of the metal edge guard molding. Unlike earlier liners constructed of plastic extrusion the liner 28 in accordance with principles of the present invention comprises a thin sheet of plastic film. In its free state the thin sheet of plastic film does not have a rigid U-shaped cross section but rather is conformable from a flat sheet into the interior of the U-shaped metallic edge guard molding to form a liner. Importantly the liner sheet is arranged so that its grain runs generally lengthwise of the metallic edge guard molding. Because the sheet of film has different degrees of tearability in different directions, particularly being more readily tearable lengthwise of the grain than across the grain, the orientation of the strip with the grain running lengthwise of the molding means that upon application of the molding to the door edge, the legs of the metallic edge guard molding will interact across the grain of the liner. Because this is the direction of maximum resistance of the sheet to tearing, the molding may therefore be assembled to the door without damaging the liner. Accordingly the liner remains intact in the completed installation to protectively insulate the metal of the molding from the metal of the door. While the preferred construction would contemplate that the grain of the plastic sheet run parallel to the length of the molding, it should be appreciated that the orientation is subject to a range of variation so long as the interaction of the free ends of the metal molding with the door, during application, is in a direction which is across the grain of the sheet of plastic film. The construction illustrated in FIGS. 2, 3 and 4 shows that the plastic sheet is applied to the plastic molding before the two are installed on the door edge. The thin plastic sheet may therefore be of generally rectangular shape whose length corresponds to the length of the metallic molding and whose width is such the liner will assume the general U-shape shown in FIGS. 2 and 3. If desired a suitable adhesive may be applied between the liner and the molding to hold the liner in place before use.

Figure 5:
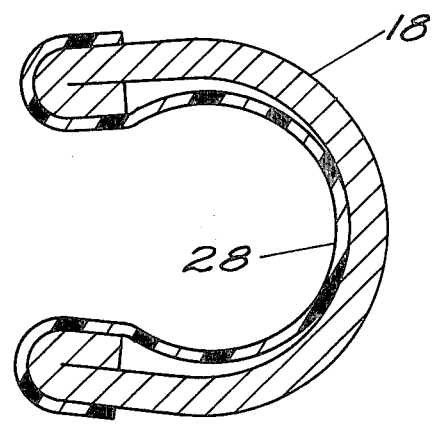
FIG. 5 is a sectional view similar to FIG. 3 showing a further embodiment.

FIG. 5 illustrates a further embodiment where the width of the plastic sheet of film is greater than that of the preceeding embodiment so as to allow the liner to wrap over and around the beads on to the outside surface of the metallic molding.

Figure 6:
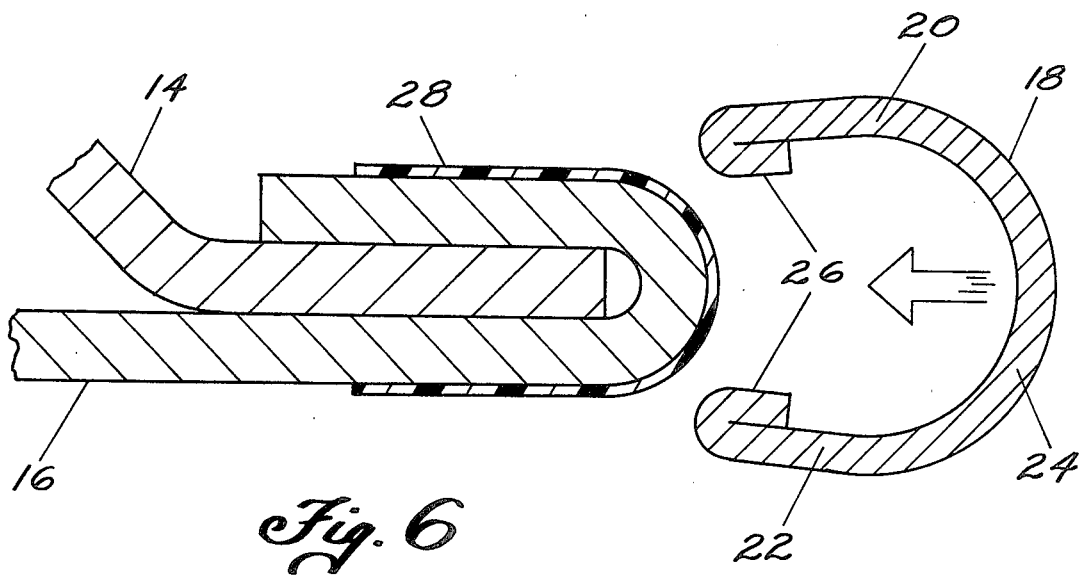
FIG. 6 is a sectional view illustrating another possible manner of assembly.
Figure 7:
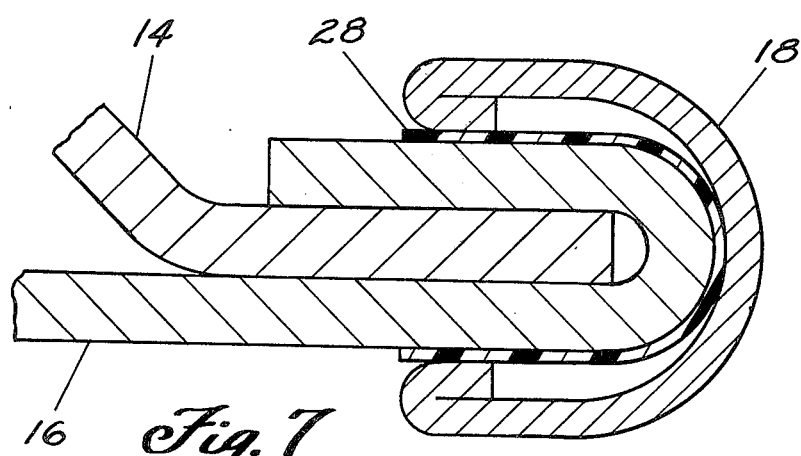
FIG. 7 is a sectional view similar to FIG. 6 showing the completed assembly.

FIG. 6 illustrates a further modification where the thin plastic film is first applied to the edge of the door before the metallic edge guard is installed. If needed, adhesive could be applied between the door and the liner to hold it in place before the metallic edge guard molding is installed. Once again it should be noted that as the metallic molding is applied to the door and liner in FIG. 6, the free ends of the legs of the metal ride across the grain of the film. FIG. 7 illustrates the complete installation which was started in FIG. 6.

Figure 8:
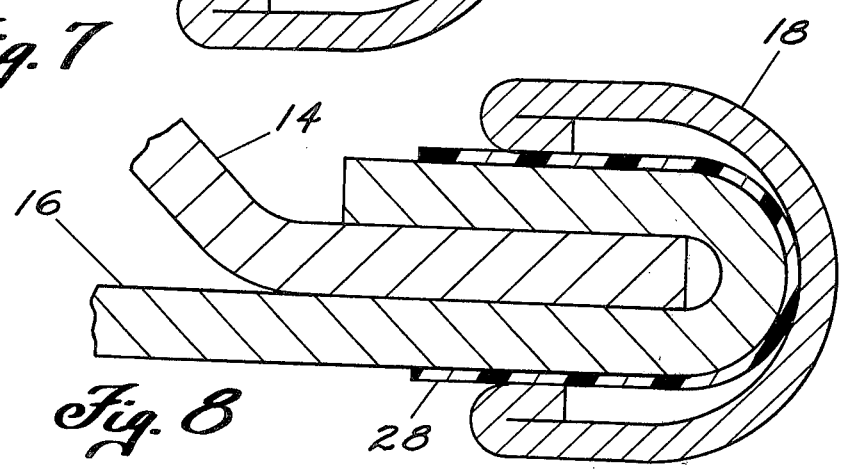
FIG. 8 is a sectional view similar to FIG. 6 illustrating a further embodiment.
Figure 9:
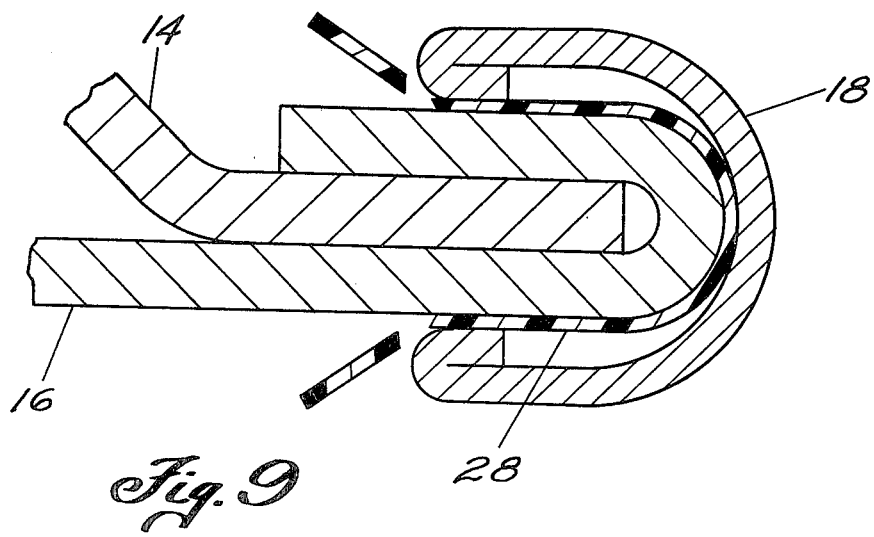
FIG. 9 is a sectional view illustrating a further modification to FIG. 8.

FIG. 8 is an embodiment similar to FIG. 6 but with additional liner material so that the liner does not have to be exactly precisely positioned on the door edge. As shown in FIG. 9 excess liner material may be carefully trimmed off after the installation is complete.

It should be appreciated that there are various, suitable plastic films which may be used in practicing the present invention. Grained polyethylene film of several mils thickness (for example 5 to 20 mils) is believed to be particularly suitable. For example grained Mylar or the like would represent an example of a suitable material. The film may possess a certain compressibility, but most importantly, is highly resistant to tearing across the grain. The invention may be readily used with a variety of metallic edge guard designs and sizes.

Therefore the invention discloses a new and useful construction for installing metallic edge guards of the type which are applied in self-retaining fashion on the edges of vehicle body closures, such as the vehicle doors.

What is claimed is:

1. In a vehicle body having a sheet metal closure, such as a door, on a marginal edge portion of which is disposed an ornamental and protective metallic edge molding of generally U-shaped cross section comprising an inner leg and an outer leg whose free ends bear against opposite sides of said marginal edge portion and a plastic liner disposed between the metallic edge molding and the closure marginal edge portion, including the location where the free ends of the legs bear against the closure marginal edge portion, to insulate the molding from the closure, the metallic edge molding being applied to the closure marginal edge portion by moving the metallic edge molding toward the closure marginal edge portion in a direction generally transverse to the length of the metallic edge molding, the improvement characterized in that the liner comprises a thin sheet of grained plastic film arranged with the grain running generally lengthwise of the edge molding.

2. In a vehicle body having a sheet metal closure such as a door, on a marginal edge portion of which is disposed an ornamental and protective metallic edge molding of generally U-shaped cross section comprising an inner leg and an outer leg whose free ends bear against opposite sides of said marginal edge portion and a plastic liner disposed between the metallic edge molding and the closure marginal metallic edge portion, including the locations where the free ends of the legs bear against the closure marginal edge portion to insulate the molding from the closure, the metallic edge molding being applied to the closure marginal metallic edge portion by moving the metallic edge molding toward the closure marginal edge portion in a direction generally transverse to the length of the metallic edge molding, the improvement characterized in that the liner comprises a thin sheet of plastic film having different degrees of tearability in different directions and arranged relative to the metallic edge molding with a direction of lesser tearability running generally in the direction of application of the metallic edge molding to the closure marginal edge portion.

3. In a vehicle body having a sheet metal closure, such as a door, on a marginal edge portion of whic is disposed an ornamental and protective metallic edge molding of generally U-shaped cross section comprising an inner leg and an outer leg whose free ends bear against opposite sides of said marginal edge portion and a plastic liner disposed between the metallic edge molding and the closure marginal edge portion, including the locations where the free ends of the legs bear against the closure marginal edge portion, to insulate the molding from the closure, the metallic edge molding being applied to the closure marginal edge portion by moving the metallic edge molding toward the closure marginal edge portion in a direction generally transverse to the length of the metallic edge molding, the improvement characterized in that the liner comprises a thin sheet of grained plastic film arranged with its grain running transverse to the direction of application of the metallic edge molding to the closure marginal edge portion.

4. In an ornamental and protective metallic edge molding adapted to be applied to a marginal edge portion of a vehicle body closure, such as a door, and comprising a generally U-shaped cross section having inner and outer legs whose free ends are adapted to bear against opposite sides of the marginal edge portion of the closure when the metallic edge molding is applied to the closure, the improvement characterized in that a thin sheet of plastic film lines the interior of the U-shaped cross section including the free ends of the legs which will bear against the marginal edge portion when the molding is applied to the closure and the sheet has different degrees of tearability in different directions and is arranged relative to the metallic edge molding with a direction of lesser tearability running generally in the direction of application of the metallic edge molding to the closure marginal edge portion.

5. In an ornamental and protective metallic edge molding adapted to be applied to marginal edge portion of a vehicle body closure, such as a door, and comprising a generally U-shaped cross section having inner and outer legs which are adapted to bear against opposite sides of the closure marginal edge portion when the metallic edge molding is installed on the closure, the improvement characterized in that a thin sheet of plastic film lines the interior of the U-shaped cross section including the free ends of the legs which bear against the closure marginal edge portion when the molding is applied to the closure, and the sheet has a grain running generally lengthwise of the edge molding.

6. In an ornamental and protective metallic edge molding adapted to be applied to a marginal edge portion of a vehicle body closure, such as a door, and comprising a generally U-shaped cross section having inner and outer legs adapted to bear against opposite sides of the closure marginal edge portion when the molding is applied to the closure, the improvement characterized in that a thin sheet of plastic film lines the interior of the U-shaped cross section including the free ends of the legs which will bear against the marginal edge portion when the molding is applied to the closure and the film has a grain running transverse to the direction of application of the metallic edge molding to the closure marginal edge portion.

* * * * *